Patented Dec. 5, 1939

2,182,242

UNITED STATES PATENT OFFICE 2,182,242

PROCESS FOR HYDROGENATING AROMATIC HYDROCARBONS

Charles B. Wooster, Providence, R. I., assignor to E. I. du Pont de Nemours & Company, Wilmington, Del., a corporation of Delaware No Drawing. Application May 3, 1938, Serial No. 205,859

8 Claims. (Cl. 260—667)

This invention relates to the reduction of aromatic compounds and more particularly to the partial hydrogenation of aromatic compounds having a monocyclic aromatic nucleus.

Heretofore the reduction of benzene and similar monocyclic aromatic compounds usually has been accomplished by reacting with hydrogen in the presence of a hydrogenation catalyst. In the case of benzene, the hydrogenation product is cyclohexane. Generally, it is not feasible by this method to produce partially hydrogenated products such as dihydrobenzene. For the production of dihydrobenzene from benzene it has been necessary heretofore first to reduce the benzene to cyclohexane by hydrogenation. The cyclohexane then may be reacted, for example with chlorine, to produce dichlor cyclohexane; finally by splitting off two moles of hydrogen chloride, the dichlor compound is converted to dihydrobenzene. Thus there has not been available heretofore a feasible single-reaction method for economically converting benzene to dihydrobenzene or for producing the corresponding dihydro derivatives of other aromatic compounds having a monocyclic aromatic nucleus.

An object of this invention is to provide an improved method for the reduction of aromatic compounds having a monocyclic aromatic nucleus. Another object is to form the dihydro derivatives of such compounds, for example dihydrobenzene, by a single chemical reaction step. Other objects will be apparent from the following description of the invention.

The above objects are attained in accordance with the present invention by reacting the aromatic compound to be reduced with an alkali metal or a similar reactive light metal such as alkaline earth metals in liquid ammonia solution, together with a hydrolytic substance such as water or alcohol. The hydrolytic agent used in the reaction may be any substance which will react with sodium in liquid ammonia in the absence of a catalyst to evolve hydrogen but which does not react completely with ammonia to form ammonium salts. Thus, for example, in place of alcohol or water, I may use as hydrolytic agent acid amides, e. g., formamide or urea, aromatic amines, e. g., aniline, alkyl mercaptans and aliphatic aldehydes. When the hydrolytic agent is one which contains a monocyclic aromatic nucleus, as for example aniline, said nucleus also may be reduced in the reaction.

In one method of practicing my invention, a liquid ammonia solution of an alkali metal is prepared. The material to be reduced, for example benzene, is placed in the liquid ammonia solution and, while the mixture is stirred, the hydrolytic agent (for example an alcohol such as methanol or ethanol) is slowly added. The ingredients immediately react to reduce the benzene to dihydrobenzene. The reaction is vigorous and occurs readily at temperatures of, for example, −35 to −40° C. The reaction usually is complete within 10 to 30 minutes after the addition of the hydrolytic agent has been completed. It is preferable, but not essential, to use an amount of alkali metal and hydrolytic agent in excess of that theoretically required to effect the reduction. However, such excess generally need not be large, for example an excess of around 5-20% usually is sufficient. After the reaction has been completed, the ammonia may be evaporated off and the product recovered by any suitable method, apparent to anyone skilled in handling chemical reactions, for example by distilling the reaction mixture.

The invention is further illustrated by the following examples:

*Example 1.—Reduction of benzene*

The apparatus consisted of a 3 liter 4-neck flask fitted with a mercury sealed stirrer, a thermometer, a separatory funnel, and a dry ice-cooled reflux condenser. Provisions were made for passing of off-gas from the reflux condenser through an acid scrubber and wet test meter for measuring the hydrogen wastage.

1000 cc. of liquid ammonia was placed in the flask and 54 grams of sodium and 39 grams of benzene added. The temperature was maintained at −35 to −38° C. by means of a dry ice-methanol bath. The stirrer was started and after the sodium had dissolved, a mixture of 39 grams of benzene and 75 grams of methanol was slowly added through the separatory funnel. An additional 39 grams of benzene and 54 grams of sodium was added to the reaction mixture and another 75 grams of methanol mixed with 39 grams of benzene added dropwise. 11.8 grams methanol was then added to insure complete reaction of the sodium.

The ammonia next was allowed to boil off, the vapors being passed through tetralin to remove any volatilized dihydrobenzene. After the ammonia had boiled off, the dihydrobenzene was distilled from the reactor at 1 to 3 mm. mercury pressure, using dry ice and methanol for cooling the condenser. Dihydrobenzene was also recovered from the tetralin scrubber by distillation and the combined distillates were washed with water to remove any methanol and ammonia. After drying over calcium chloride, the material was distilled through a fractionating column, separating that fraction distilling at 87–89° C.

The following data were obtained:

Product, distilling at 87–89° C _____ g __ 141.6
Dihydrobenzene in product as determined by bromination (93.9% by wt.) _____ g __ 132.8
Total yield of dihydrobenzene, based on benzene used _____ per cent theory __ 83.0
Yield of dihydrobenzene based on sodium used _____ per cent theory __ 70.5

The product was identified as 1–4 dihydrobenzene by bromine absorption, boiling point (87–89° C.) and melting point of its tetrabromide (184–185° C.).

*Example 2.—Reduction of toluene*

Using the apparatus described under Example 1, 46 g. of sodium was dissolved in 1000 cc. of liquid ammonia in the 3 liter reaction flask, the temperature being maintained at −40 to −50° C. 92 g. of toluene mixed with 64 g. of methanol was slowly added, the mixture being stirred continuously. 20 g. additional methanol then was added to cause complete reaction of the sodium. 18.5 g. more of sodium then was added and this was followed by 36 g. of methanol. The ammonia then was allowed to evaporate and the product was vacuum distilled (1–3 mm. Hg.) from the sodium methylate. After washing the product several times with water and drying over calcium chloride it weighed 77.9 g. (yield: 83% of theory, based on toluene). 9100 cc. of hydrogen (S. T. P.) was evolved equivalent to 18.65 g. of sodium or, in other words, 99.6% theory of the hydrogen required for forming dihydrotoluene was reacted.

The product distilled at 113 to 115.5° C., over 95% coming over at 114 to 115.4° C. (original toluene distilled at 108 to 109° C.). When a small amount of the material was added to concentrated sulfuric acid, it evolved heat and the mixture turned dark red. The main fraction distilling at 114 to 115.4° C. had a refractive index of 1.4700 at 20° C. In the dark at 0° C. it took up bromine in the ratio of one mol. of bromine for one mol. (94 g.) of reduction product, indicating the formation of a dibromide.

*Example 3.—Reduction of xylene*

A mixture of the xylene isomers was reduced by a procedure similar to that described in Example 2. The procedure varied in that after evaporating the ammonia, the product was steam distilled from the reaction flask, instead of vacuum distilled as in the case of toluene. The hydrocarbon layer was separated from the distillate, washed several times with water and dried over calcium chloride. Weight 141.8 g. (yield: 87.6% of theory based on xylene). The hydrogen evolved during the reduction (16,230 cc. S. T. P.) was equivalent to 33.38 g. of the sodium or, in other words, 88% of the theory of hydrogen required to form dihydroxylene was reacted.

The product reacted with concentrated $H_2SO_4$ with the evolution of heat. It added bromine in the dark at 0° C. in the ratio of 0.95 mol. of bromine per mol. (108 g.) of the reduction product.

*Example 4.—Reduction of tetralin*

This procedure was carried out in a manner similar to that described above for the reduction of xylene. Weight of recovered product 193.1 g. (96.2% theory based on tetralin used). The hydrogen evolved during the reduction (11,800 cc. S. T. P.) was equivalent to 24.21 g. of sodium or the hydrogen reacted was equivalent to 90.2% of the theory for the formation of hexahydronaphthalene. The product distilled at 199.5 to 204.5° C., 91% coming over at 199.5 to 203.5° C. The original tetralin distilled at 204.3 to 205° C. In the dark at 0° C. the main fraction of the product took up 0.957 mol. of bromine per mol. (134 g.) of reduction product.

*Example 5.—Reduction of anisole*

This procedure was carried out in the same manner as that described above for the reduction of xylene. Weight of product recovered, 36 g. (71.7% of theory, based on anisole). Measurement of the hydrogen evolved indicated that hydrogen was absorbed equivalent to 103% of theory for the formation of dihydroanisole.

The product reacted vigorously with concentrated $H_2SO_4$. 85% distilled at 146 to 148° C. (original anisole distilled at 153 to 154° C.).

The main fraction (85%) absorbed 0.973 mol. of bromine per mol. (110 g.) at 0° C. in the dark, indicating the formation of a dibromide.

*Example 6.—Reduction of dimethyl aniline*

This reduction was carried out in a manner similar to that described above for xylene. Weight of product recovered 48 g. (39% theory based on dimethyl aniline). Measurement of the hydrogen evolved during the reduction indicated that hydrogen was absorbed equivalent to 113% of that required for the formation of dihydrodimethyl aniline.

*Example 7.—Reduction of 1–4 dihydronaphthalene*

This reduction was carried out in a manner similar to that described above for the reduction of xylene.

The material to be reduced contained by analysis 83% dihydronaphthalene, the impurities being mainly tetralin and naphthalene. The reduction product appeared to be a tetrahydronaphthalene having properties different from those of 1,2,3,4-tetrahydronaphthalene (tetralin).

As shown by the above examples, this process is suitably for forming the dihydro derivatives of a variety of compounds having the monocyclic aromatic nucleus, i. e. compounds having the benzene ring. Any organic compound which contains a benzene ring in its molecule may be reduced by the method of the present invention. This statement includes, for example, compounds which have in their molecules benzene rings condensed with cyclo-aliphatic rings, for example 1,2,3,4-tetrahydronaphthalene (tetralin) and 1,4-dihydronaphthalene. Aromatic ethers, which do not react with sodium, substituted aromatic amines, and various alkyl benzenes, are further examples of aromatic compounds which may be reduced by this method. The compounds to be reduced also are not necessarily restricted to those compounds which have only one benzene ring; for example, substances such as diphenyl ethane and the like also may be reduced by this method. In any event, whatever benzene ring or rings that are present will be reduced to the corresponding dihydrogenated ring. In all cases, the benzene ring is converted to the corresponding dihydro derivative and the reduction goes no further. That is, two and only two atoms of hydrogen are added to each benzene ring reduced by this method.

In carrying out the process, the invention is not restricted to the exact procedures described above, as various modifications and variations may be utilized without departing from the spirit and scope of this invention. For example, the order in which the reactants are added to the liquid ammonia may be varied. The substance to be reduced, together with the hydrolytic agent, may first be added to the liquid ammonia and the alkali or alkaline earth metal added last. Or, I may first dissolve the alkali metal in the liquid ammonia and add thereto a mixture of the hydrolytic agent and the substance to be reduced. It of course would not be practical to add the hydrolytic agent to the sodium in liquid ammonia before adding the material to be reduced because in that case a considerable amount of the alkali metal would be reacted with evolution of hydrogen before the material to be reduced could be added. In order to completely convert the raw material to the dihydroderivative (e. g., benzene to dihydrobenzene), I prefer to use an excess of the metal reactant. Usually, with an excess of 5 to 20% of metal over the theoretical amount, a substantially 100% conversion can be obtained. In order to assure complete reaction of the metal in reasonable time, it is preferred to add the hydrolytic agent in an excess of, e. g., 10%, over the amount theoretically required to react with the metal.

As stated above, the hydrolytic agent used may be any substance which will react with sodium in liquid ammonia solution in the absence of a catalyst to evolve hydrogen but which does not react completely with ammonia to form ammonium salts. Examples of the types of compounds suitable as hydrolytic agents are: aliphatic alcohols, both cyclic and non-cyclic; acid amides, including amides of both aliphatic and aromatic acids; primary aryl amines; alkyl mercaptans; aliphatic aldehydes; and water. Generally, it is preferable to employ compounds which themselves are not reduced by the process. For example, the following specific compounds have been found to be suitable as hydrolytic agents in the present procsess: methanol, ethyl alcohol, isopropyl alcohol, tertiary amyl alcohol, methyl cyclohexanol, formamide, urea, aniline, propyl mercaptan, water, and acetaldehyde. All of these materials will react with sodium in liquid ammonia to evolve hydrogen in the absence of catalysts. None of them will react completely with ammonia to form ammonium salts. On the other hand, the following compounds, which do react completely with ammonia to form ammonium salts, have been found to be unsuitable as hydrolytic agents in my process, even though they may react with sodium to evolve hydrogen: phenol, hydrogen chloride, acetic acid and carbon dioxide. The invention is not necessarily restricted to the above examples of materials suitable as hydrolytic agents, which have been listed to illustrate the scope of the invention.

The yield of product will vary somewhat for the different hydrolytic agents. In general, it has been found that the alcohols give the best results in this respect, especially the alcohols having five or less carbon atoms per molecule. Of these, methanol and ethanol are preferred, both because of the high yields obtained and because these alcohols are relatively cheap and readily available.

Further, this invention is not restricted to the use of liquid ammonia as the reaction solvent. Primary aliphatic amines which will dissolve alkali metals also may be used for this purpose. For example, satisfactory results have been obtained by using liquid methylamine and ethylene diamine as solvent, in the reduction of benzene to dihydrobenzene by the present invention. However, liquid ammonia is the preferred solvent, as the yields in the amine solvents, although substantial, generally are considerably lower than those obtained with liquid ammonia.

In place of sodium, the other alkali metals, e. g. potassium, lithium and the others may be used with substantially the same results in practicing this invention. Further, it has been found that the alkaline earth metals, calcium, barium and strontium, and also magnesium, may be used in place of sodium. I prefer to use the alkali metals, which are more reactive.

I claim:

1. The process which comprises reacting together in a liquid solvent medium selected from the group consisting of liquid ammonia and those aliphatic amines which dissolve alkali metal, an organic compound having a monocyclic aromatic nucleus, a light metal selected from the group consisting of the alkali metals, the alkaline earth metals and magnesium; and a hydrolytic agent comprising a substance which reacts with sodium in liquid ammonia solution in the absence of a catalyst to evolve hydrogen but which will not react completely with ammonia to form an ammonium salt.

2. The process which comprises reacting together in liquid ammonia solution an organic compound having a monocyclic aromatic nucleus, a light metal selected from the group consisting of the alkali metals, the alkaline earth metals and magnesium; and a hydrolytic agent comprising a substance which reacts with sodium in liquid ammonia solution in the absence of a catalyst to evolve hydrogen but which will not react completely with ammonia to form an ammonium salt.

3. The process which comprises reacting together in liquid ammonia solution an organic compound having a monocyclic aromatic nucleus, a light metal selected from the group consisting of the alkali metals, the alkaline earth metals and magnesium; and a hydrolytic agent comprising a substance which reacts with sodium in liquid ammonia solution in the absence of a catalyst to evolve hydrogen but which will not react completely with ammonia to form an ammonium salt.

4. The process which comprises reacting together in liquid ammonia solution a monocyclic aromatic hydrocarbon, a light metal selected from the group consisting of the alkali metals, the alkaline earth metals and magnesium; and a hydrolytic agent comprising a substance which reacts with sodium in liquid ammonia solution in the absence of a catalyst to evolve hydrogen but which will not react completely with ammonia to form an ammonium salt.

5. The process which comprises reacting together in liquid ammonia solution a monocyclic aromatic hydrocarbon, a light metal selected from the group consisting of the alkali metals, the alkaline earth metals and magnesium; and an aliphatic alcohol.

6. The process which comprises reacting together in liquid ammonia solution benzene, sodium, and an aliphatic alcohol.

7. The process which comprises reacting together in liquid ammonia solution toluene, sodium, and an aliphatic alcohol.

8. The process which comprises reacting together in liquid ammonia solution xylene, sodium, and an aliphatic alcohol.

CHARLES B. WOOSTER.

CERTIFICATE OF CORRECTION.

Patent No. 2,182,242. December 5, 1939.

CHARLES B. WOOSTER.

It is hereby certified that error appears in the printed specification of the above numbered patent requiring correction as follows: Page 2, second column, line 3, for "$H_2O_4$" read $H_2SO_4$; and that the said Letters Patent should be read with this correction therein that the same may conform to the record of the case in the Patent Office.

Signed and sealed this 16th day of January, A. D. 1940.

(Seal)

Henry Van Arsdale,
Acting Commissioner of Patents.